US006772418B1

(12) United States Patent  
Morris

(10) Patent No.: US 6,772,418 B1  
(45) Date of Patent: Aug. 3, 2004

(54) METHOD AND SYSTEM FOR MANAGING SUBSCRIPTIONS USING A PUBLISHER TREE

(75) Inventor: Robert Paul Morris, Raliegh, NC (US)

(73) Assignee: IPAC Acquisition Subsidiary, LLC, Peterborough, NH (US)

( * ) Notice: Subject to any disclaimer, the term of this patent is extended or adjusted under 35 U.S.C. 154(b) by 0 days.

(21) Appl. No.: 09/504,298

(22) Filed: Feb. 15, 2000

(51) Int. Cl.[7] .............................................. G06F 9/46
(52) U.S. Cl. ..................................................... 719/318
(58) Field of Search .......................... 709/318; 719/318

(56) References Cited

U.S. PATENT DOCUMENTS

| | | | | |
|---|---|---|---|---|
| 5,826,253 A | * | 10/1998 | Bredenberg ..................... 707/2 |
| 5,887,172 A | * | 3/1999 | Vasudevan et al. .......... 709/328 |
| 6,314,533 B1 | * | 11/2001 | Novik et al. ................... 714/39 |
| 6,438,618 B1 | * | 8/2002 | Lortz et al. .................. 709/318 |

FOREIGN PATENT DOCUMENTS

GB          2354349 A  *  3/2001  ............. G06F/9/46

* cited by examiner

Primary Examiner—Meng-Al T. An  
Assistant Examiner—The Thanh Ho

(74) Attorney, Agent, or Firm—Sawyer Law Group LLP

(57) ABSTRACT

The present invention provides a method and system for managing subscriptions in a software system. The method includes sending a request to a child notification publisher to send a notification message to at least one subscriber on the child, notification publisher's subscriber list; sending the notification message to the subscribers on the child notification publisher's subscriber list; and sending a request to a parent notification publisher to send the notification message to the at least one subscriber on the parent notification publisher's subscriber list. The method and system in accordance with the present invention utilizes a publisher tree for managing subscriptions. This tree allows event subscribers to request subscriptions at a granular level without requiring the event subscribers who do not need a granular subscription to have multiple subscriptions to receive whole categories of messages from event sources. Further, this tree does not require the event sources to know anything about the event subscribers or what messages they are interested in receiving. Event sources only need to know the most granular level of subscriptions that the system supports, i.e., the leaf nodes of the tree. The structure of the publisher tree may thus be dynamically altered without the need to rewrite the programs at the event sources and subscribers. If the leaf nodes change, then the event sources will require minimal modifications, and the event subscribers will require updating. These changes may be implemented at run-time. The present invention also requires less event processing time and memory than conventional methods.

16 Claims, 6 Drawing Sheets

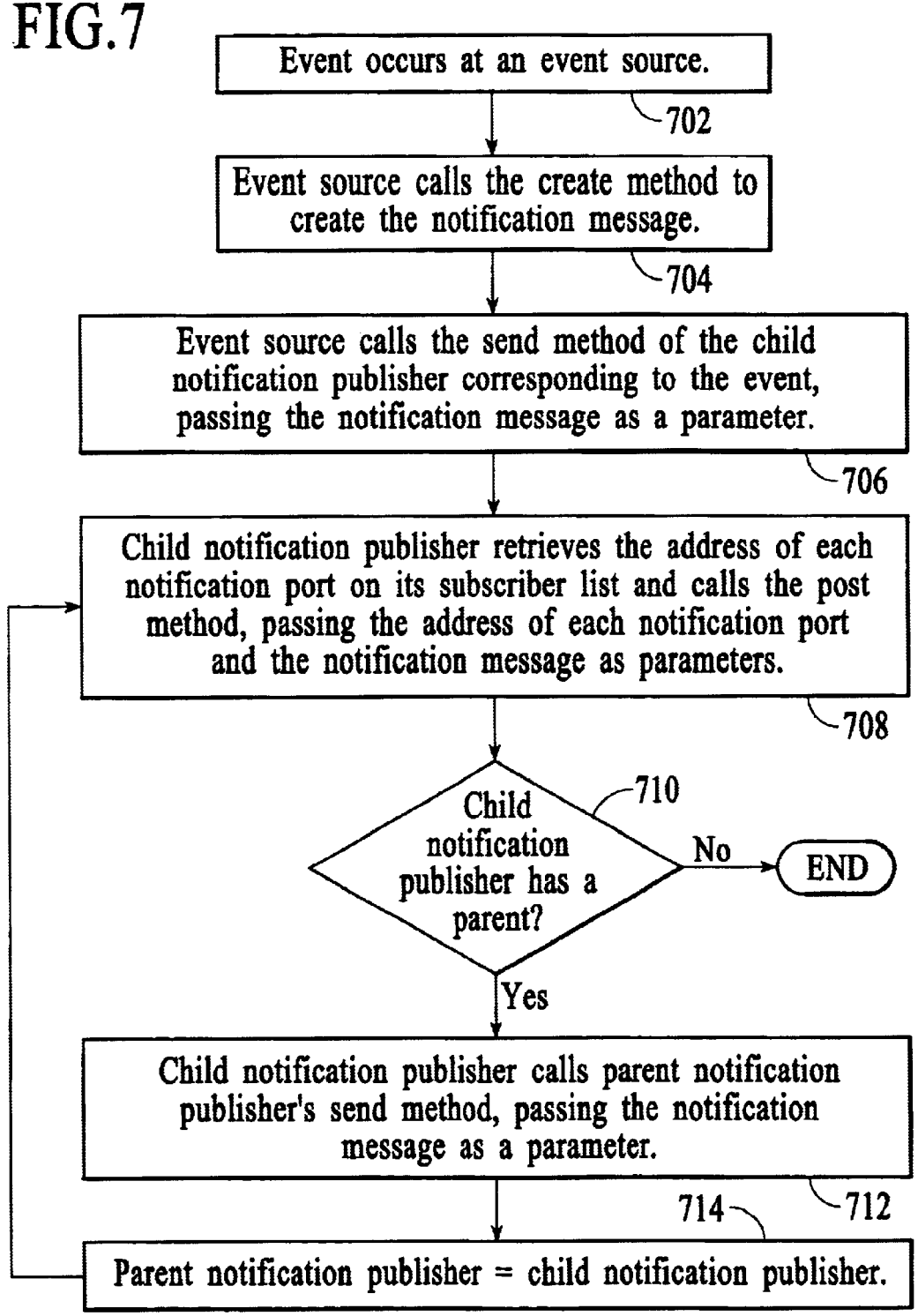

METHOD AND SYSTEM FOR MANAGING SUBSCRIPTIONS USING A PUBLISHER TREE

FIELD OF THE INVENTION

The present invention relates to event notification in a software system, and more particularly to the managing of subscriptions in event notification in a software system.

BACKGROUND OF THE INVENTION

Software systems which use subscription based message delivery systems are well known in the art. A typical event model utilizes event subscribers and event sources. JAVA 1.1 is one example software system which uses this event model. Event sources are software components which send notifications of its events to software components on its subscriber list. Event subscribers are software components which are to be notified of events on another software component. An event subscriber sends a request to an event source to be placed on its subscriber list. The event source then forwards notifications for all events that it generates to the event subscribers on its subscriber list.

This model requires event subscribers to subscribe to receive all notifications from an event source or none at all. However, event subscribers typically are not interested in all of the events of an event source. For example, in a digital camera, an event subscriber may be a software component which controls the hardware for capturing an image. An event source may be a software component that controls the buttons on the digital camera. Because of its function, the software component is only interested in shutter button events and not all button events. However, in a conventional digital camera, the software component is required to subscribe to all button events. It then must expend time and memory to examine all button event notifications and process only those pertaining to the shutter button.

On some systems, the notifications are partitioned into categories or subsets of notifications. However, to support such partitioning, either the event subscribers have a more complex subscription process and/or the event sources have a more complex task in managing the various subscription levels. In either instance, supporting partitioned notifications consumes more processor time and memory resources. In addition, with partitions, for event subscribers to be notified of all events of an event source, or to be notified of events in more than one category, the event subscriber would need to separately subscribe to each event category of interest. This further complicates the task of event sources in managing their subscriber lists.

Accordingly, there exists a need for an improved method and system for managing subscriptions in a software system. The present invention addresses such a need.

SUMMARY OF THE INVENTION

The present invention provides a method and system for managing subscriptions in a software system. The method includes sending a request to a child notification publisher to send a notification message to at least one subscriber on the child notification publisher's subscriber list; sending the notification message to the subscribers on the child notification publisher's subscriber list; and sending a request to a parent notification publisher to send the notification message to the at least one subscriber on the parent notification publisher's subscriber list. The method and system in accordance with the present invention utilizes a publisher tree for managing subscriptions. This tree allows event subscribers to request subscriptions at a granular level without requiring the event subscribers who do not need a granular subscription to have multiple subscriptions to receive whole categories of messages from event sources. Further, this tree does not require the event sources to know anything about the event subscribers or what messages they are interested in receiving. Event sources only need to know the most granular level of subscriptions that the system supports, i.e., the leaf nodes of the tree. The structure of the publisher tree may thus be dynamically altered without the need to rewrite the programs at the event sources and subscribers. If the leaf nodes change, then the event sources will require minimal modifications, and the event subscribers will require updating. These changes may be implemented at run-time. The present invention also requires less event processing time and memory than conventional methods.

BRIEF DESCRIPTION OF THE FIGURES

FIG. 7 is a flowchart illustrating in more detail the sending of notification messages using a publisher tree in accordance with the preferred embodiment of the present invention.

DETAILED DESCRIPTION

The present invention provides an improved method and system for managing subscriptions in a software system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method and system in accordance with the present invention utilizes a publisher tree for managing subscriptions. The publisher tree allows event subscribers to request subscriptions at a granular level without requiring the event subscribers who do not need a granular subscription to subscribe to receive whole categories of messages from event sources. Further, the publisher tree does not require the event sources to know anything about the event subscribers or what messages they are interested in receiving. Event sources only need to know the most granular level of subscriptions that the system supports, that is, the leaf nodes of the publisher tree.

To more particularly describe the features of the present invention, please refer to FIGS. 1 through 7 in conjunction with the discussion below.

Figure 1:
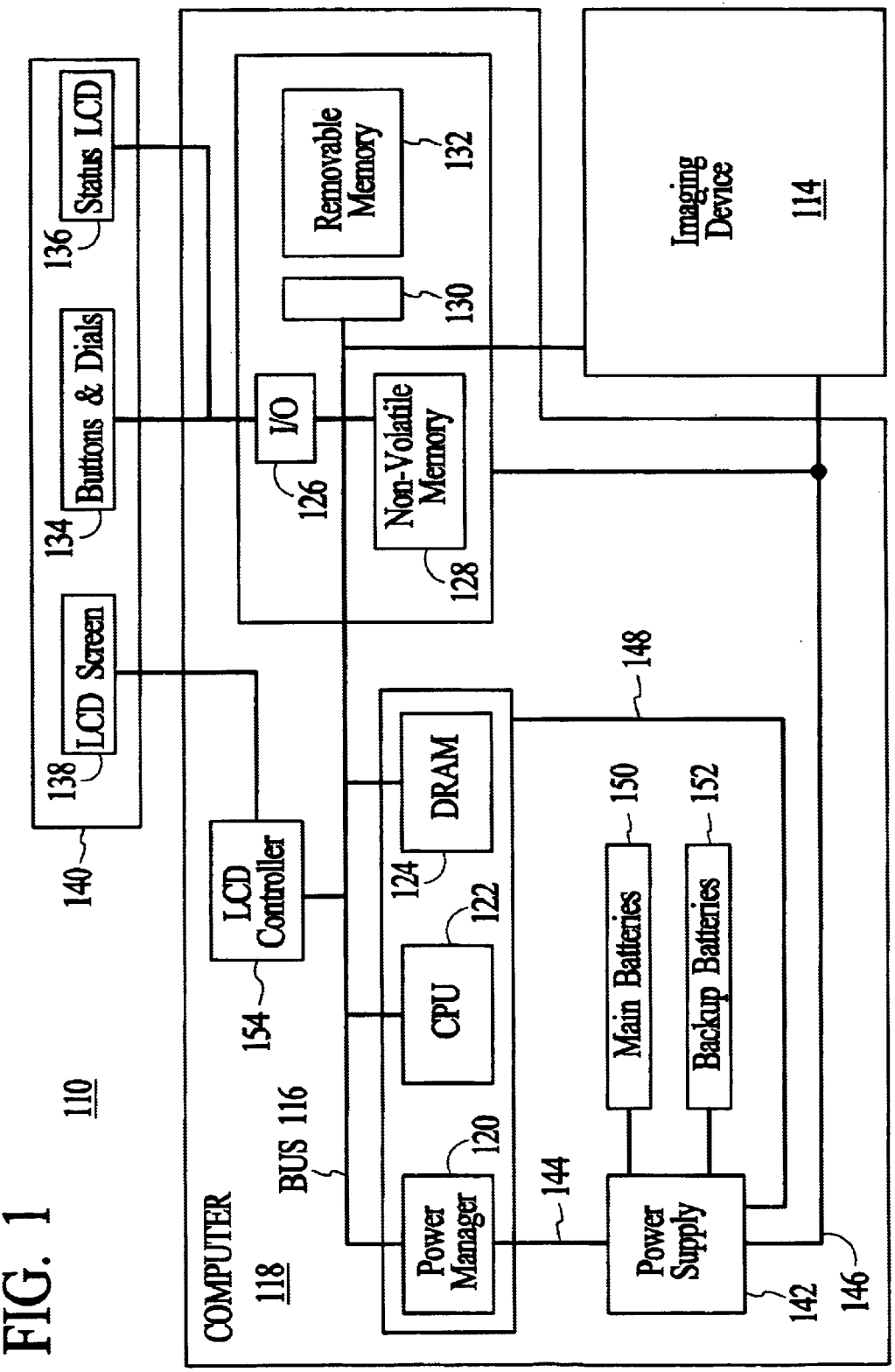
FIG. 1 illustrates a preferred embodiment of a digital camera which utilizes the method and system in accordance with the present invention.

FIG. 1 illustrates a preferred embodiment of a digital camera which utilizes the method and system in accordance with the present invention. Camera 110 preferably comprises an imaging device 114, a system bus 116 and a computer 118. Imaging device 114 includes an image sensor, such as a charged coupled device (CCD) or a CMOS sensor, for generating a set of raw image data representing a captured image. In a preferred embodiment, system bus 116 provides connection paths between imaging device 114, an optional power manager 120, central processing unit (CPU) 122, dynamic random-access memory (DRAM) 124, input/output interface (I/O) 126, non-volatile memory 128, and buffers/connector 130 that connect an optional removable memory 132 to system bus 116.

CPU 122 may include a conventional microprocessor device for controlling the operation of camera 110. In the preferred embodiment, CPU 122 is capable of concurrently running multiple software routines to control the various processes of camera 110 within a multithreaded environment. For example, images may be captured at the same time that previously captured images are processed in the background to effectively increase the capture rate of the camera. In a preferred embodiment, CPU 122 runs an operating system that includes a menu-driven GUI and provides image processing through software, rather than hardware. An example of such software is the Digita™ Operating Environment by FlashPoint Technology of San Jose, Calif. Although CPU 122 is preferably a microprocessor, one or more DSP's (digital signal processor) or ASIC's (Application Specific Integrated Circuit) could also be used.

I/O 126 is an interface device allowing communications to and from computer 118. For example, I/O 126 permits an external host computer (not shown) to connect to and communicate with computer 118. I/O 126 also interfaces with a plurality of buttons and/or dials 134, and an optional status LCD 136, which in addition to the LCD screen 138, are the hardware elements of the camera's user interface 140.

Non-volatile memory 128, which may typically comprise a conventional read-only memory or flash memory, stores a set of computer-readable program instructions to control the operation of camera 110. Removable memory 132 serves as an additional image data storage area and is preferably a non-volatile device, such a flash disk, readily removable and replaceable by a camera 10 user via buffers/connector 130.

Power supply 142 supplies operating power to the various components of camera 110. Power manager 120 communicates via line 144 with power supply 142 and coordinates power management operations for camera 110. In the preferred embodiment, power supply 142 provides operating power to a main power bus 146 and also to a secondary power bus 148. The main power bus 146 provides power to imaging device 114, I/O 126, non-volatile memory 128 and removable memory 130. The secondary power bus 148 provides power to power manager 120, CPU 122 and DRAM 124.

Power supply 142 is connected to main batteries 150 and also to backup batteries 152. In the preferred embodiment, a camera 110 user may also connect power supply 142 to an external power source. During normal operation of power supply 142, the main batteries 150 provide operating power to power supply 142 which then provides the operating power to camera 110 via both main power bus146 and secondary power bus 148. During a power failure mode in which the main batteries 150 have failed (when their output voltage has fallen below a minimum operational voltage level) the backup batteries 152 provide operating power to power supply 142 which then provides the operating power only to the secondary power bus 148 of camera 110.

Dynamic Random-Access-Memory (DRAM) 124 is a contiguous block of dynamic memory that may be selectively allocated for various storage functions. DRAM 124 stores both raw and compressed image data and is also used by CPU 122 while executing the software routines used within computer 118. The raw image data received from imaging device 114 is temporarily stored in several input buffers (not shown) within DRAM 124. Once the raw image data is processed, it is stored in a frame buffer (not shown) for display on the LCD screen 138. In a preferred embodiment, the input buffers and the frame buffer are split into two ping-pong buffers to improve the display speed of the digital camera and to prevent the tearing of the image in the display 138. After processed image data has been stored in DRAM 124, LCD controller 154 transfers the image data to LCD screen 138 for display.

Figure 2:
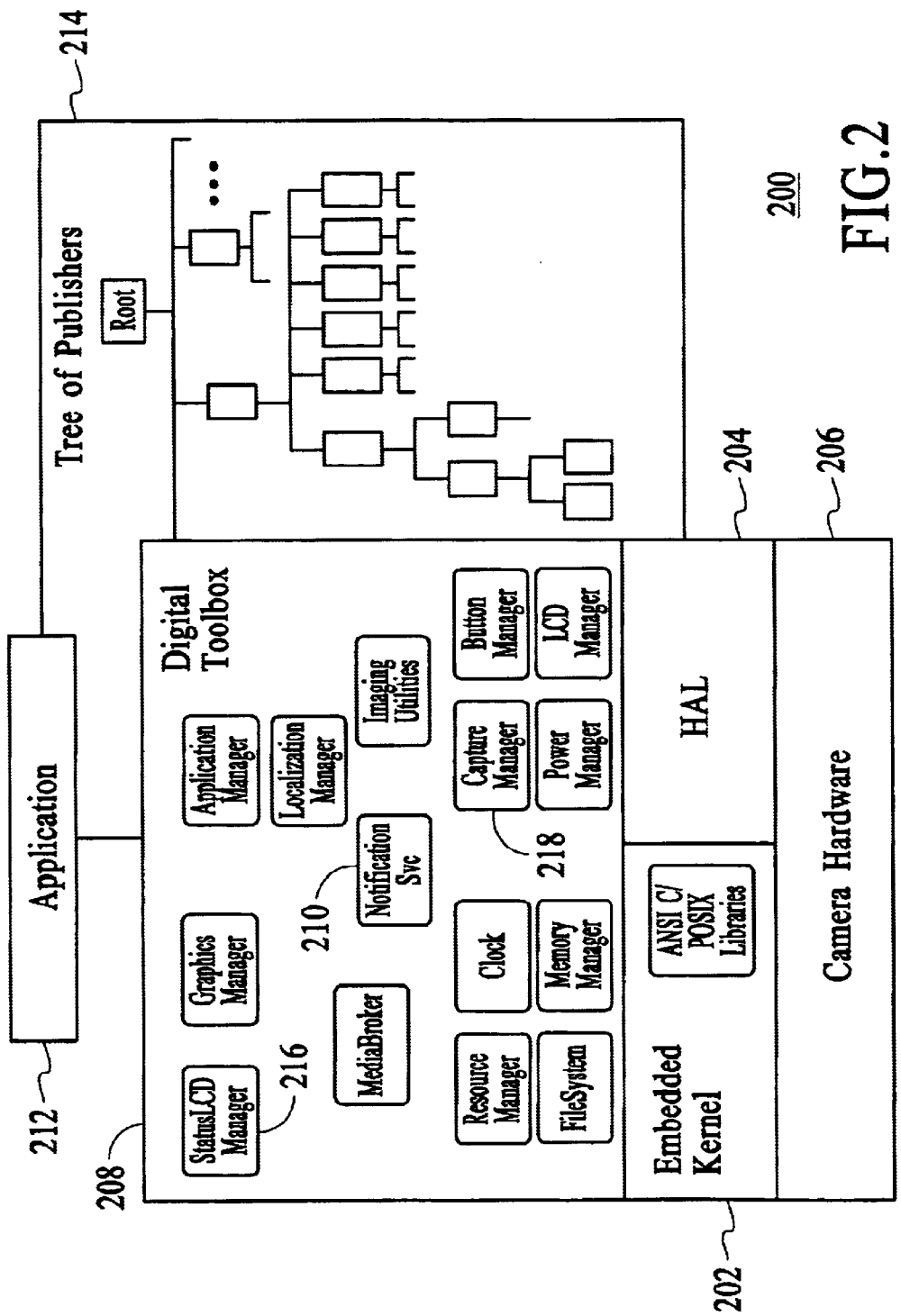
FIG. 2 is a block diagram of a preferred embodiment of a digital camera software subsystem which may use the publisher tree in accordance with the present invention.

FIG. 2 illustrates a preferred embodiment of a digital camera software subsystem which utilizes a publisher tree in accordance with the present invention. This software subsystem 200 would be part of the software routines stored in the DRAM 124 of the digital camera 110. The major software components of the subsystem 200 comprise an embedded operating system 202 which provides system services such as interprocess communication, basic memory management, a task scheduler, etc. In the preferred embodiment, the operating system 202 is the Digita™ OE. It also comprises a hardware abstraction layer (HAL) 204 which provides an interface to the hardware components 206 not supported by the operating system 202. This hardware is typically specific to the camera 110 itself and contains the hardware illustrated in FIG. 1. The subsystem 200 also comprises a Digita™ OE Toolbox 208 and an application 212. The toolbox 208 provides access to services tailored for digital imaging devices. Some typical services are depicted, including a notification service 210 which manages event notifications between the various software components. The application 212 controls the camera and the user's interaction with the camera.

In addition, the subsystem 200 comprises a tree of publishers 214. The tree 214 is drawn to the side and behind the other software components to illustrate that it can be viewed as a separate software subsystem that is available for use by all of the software components in the digital camera. At the same time, the individual notification publishers in the tree 214 are owned by various software components. These various software components create their respective notification publishers upon initialization of the digital camera 110 upon first use and store them in the DRAM 124. Thereafter, the structure of the tree and the relationships between the publishers are dynamic and may be altered by their owning components.

Figure 3:
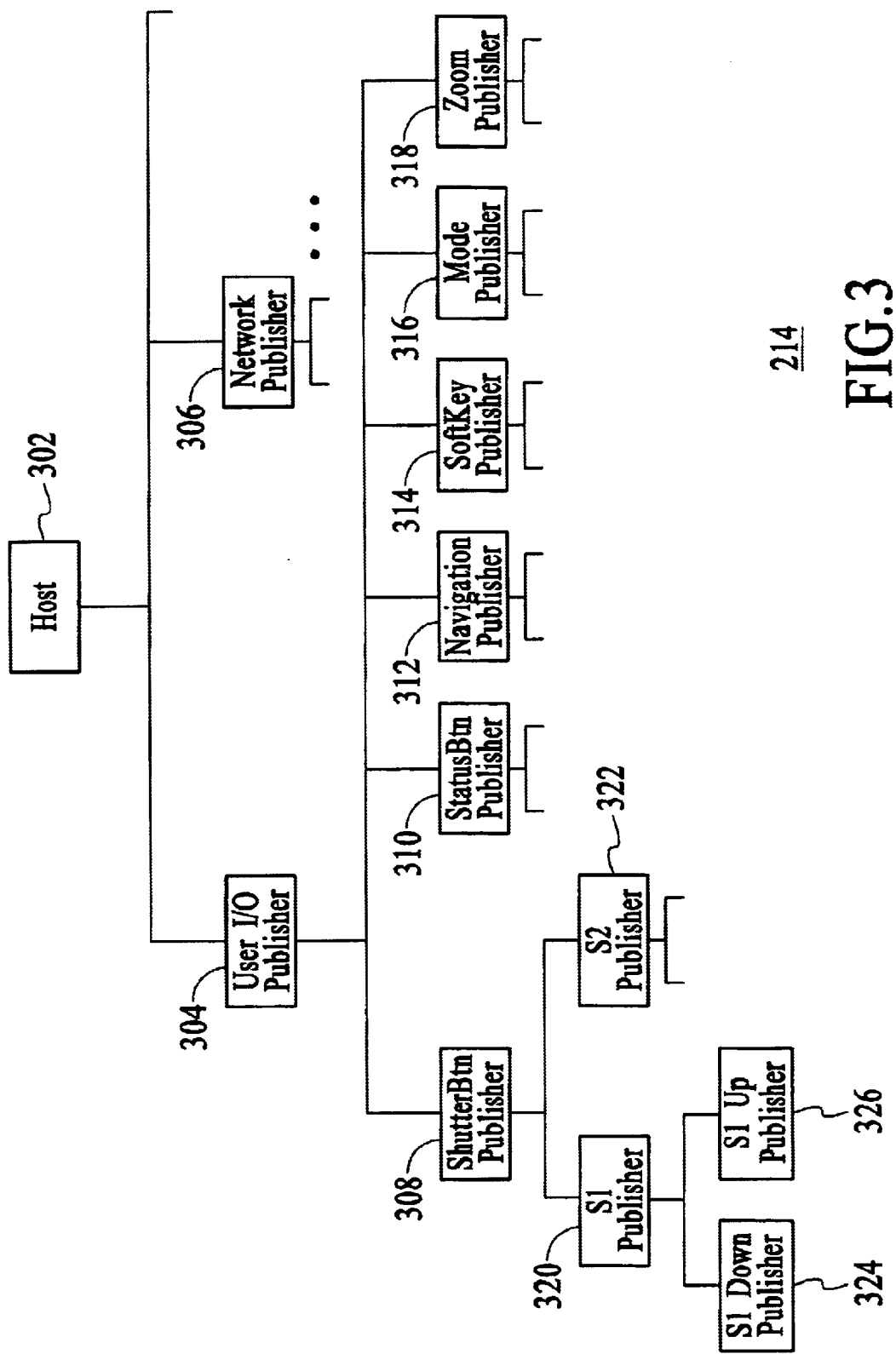
FIG. 3 illustrates a preferred embodiment of a publisher tree in accordance with the present invention.

FIG. 3 illustrates in more detail a preferred embodiment of a publisher tree in accordance with the present invention. The publisher tree 214 has nodes of notification publishers. Each node may have one or more child nodes of notification publishers. Each notification publisher manages the notifications of a particular set of one or more events for an event source. The notification publishers at child nodes manage the notifications of a subset of events of its parent notification publisher. Each notification publisher has its own subscriber list containing the event subscribers interested in its set of events and a reference to its parent notification publisher.

At the top of the tree is the root node 302. Event subscribers interested in receiving notifications concerning all events, i.e., all notifications published by all publishers in the tree, would make a subscription request to the notification publisher at the root node 302. For example, in a digital camera utilizing the Digita™ OE, the Status LCD Manager 216 monitors and displays system status information on the status LCD 136. It subscribes with the root node 302 and thus receives and monitors all notifications generated in the digital camera 110.

Below the root node are child nodes. For example, one child node is a publisher of user input/output (I/O) notifications, User I/O Publisher 304. Users interact with the digital cameras typically through the pushing of buttons or the setting of dials 134. Software components wishing to receive all user I/O notifications would subscribe to the User I/O Publisher 304. For example, the application 212 controlling the camera would probably be interested in all buttons and dials the user manipulates and thus would subscribe to the User I/O Publisher 304. The other child node is a publisher of network related notifications, Network Publisher 306. Other child nodes are possible at this level, such as publishers for disk notifications, image processing notifications, capture notifications, etc. Each of these publishers may have child nodes which publish subsets of these sets of notifications.

The User I/O Publisher 304 may have other child nodes as well. In this example, the child nodes includes a Shutter Button Publisher 308, which publishes notifications relating to the shutter button, which controls the capture of images; a Status Button Publisher 310, which publishes notifications relating to the buttons associated with the camera's status LCD 136; a Navigation Publisher 312, which publishes notifications relating to the buttons associated with navigation; a Softkey Publisher 314, which publishes notifications relating to specifics of the application 212; a Mode Publisher 316, which publishes notifications relating to a mode control to set the camera 110 to take pictures, view pictures, connect to a network, etc.; and a Zoom Publisher 318, which publishes notifications relating to a zoom control. Other child nodes are also possible.

The Shutter Button Publisher 308 may also have its own child nodes. For example, the shutter button of the digital camera 110 has two positions: S1 (partially depressed) and S2 (fully depressed). When the shutter button is in the S1 position, the Capture Manager 218 (FIG. 2) prepares the camera 110 to capture the image, such as preparing a capture buffer, setting the auto-exposure, auto-focus, and other camera parameters. When the shutter button is in the S2 position, the Capture Manager 218 captures the image. Thus, the child nodes of the Shutter Button Publisher 308 may include an S1 Publisher 320, which publishes S1 related notifications, and an S2 Publisher 322, which publishes S2 related notifications. To provide even more granularity, the S1 Publisher 320 may have child nodes, S1 Down Publisher 324 and S1 Up Publisher 326, which publishes S1 Down and S1 Up related notifications, respectively.

Although the preferred embodiment of the publisher tree 214 is described with the above structure and relationships, one of ordinary skill in the art will understand that other structures and relationships are possible without departing from the spirit and scope of the present invention. The actual structure and relationships of a publisher tree depends on the requirements of the particular software environment in which it operates.

In the preferred embodiment, each notification publisher in the tree contains its own subscriber list and a reference to its parent notification publisher. Thus, for the tree 214 in FIG. 2, the notification publisher at the root node 302 contains a list of subscribers interested in all notifications published by all publishers in the tree 214. Since it is the root node, it has no reference to a parent notification publisher. User I/O Publisher 304 contains a list of subscribers interested in all user I/O events, and the Network Publisher 306 contains a list of subscribers interested in all network related events. Both the User I/O Publisher 304 and the Network Publisher 306 also contain references to their parent, the notification publisher at the root node 302.

The Shutter Button Publisher 308 contains a list of subscribers interested only in shutter button related events but not other user I/O events. The Shutter Button Publisher 308 also contains a reference to its parent, the User I/O Publisher 304.

Similarly, the S1 Publisher 320 contains a list of subscribers interested only when the shutter button is in the S1 position, and the S2 Publisher 322 contains a list of subscribers interested only when the shutter button is in the S2 position. Both the S1 Publisher 320 and the S2 Publisher 322 also contain references to their parent, the Shutter Button Publisher 308. The S1Down Publisher 324 contains a list of subscribers interested only when the shutter button is down in the S1 position, and the S1 Up Publisher 326 contains a list of subscribers interested only when the shutter button is released from the S1 position. Both publishers, 324 and 326, also contain references to their parent, the S1 Publisher 320.

Although the publisher tree 214 is illustrated as being used by the software subsystem 200 illustrated in FIG. 2, other subscription-based systems may use the publisher tree 214 in accordance with the present invention without departing from the spirit and scope of the present invention.

To more particularly describe how the publisher tree 214 in accordance with the present invention manages subscriptions, please refer to FIGS. 4 through 7 in conjunction with the discussion below.

Figure 4:
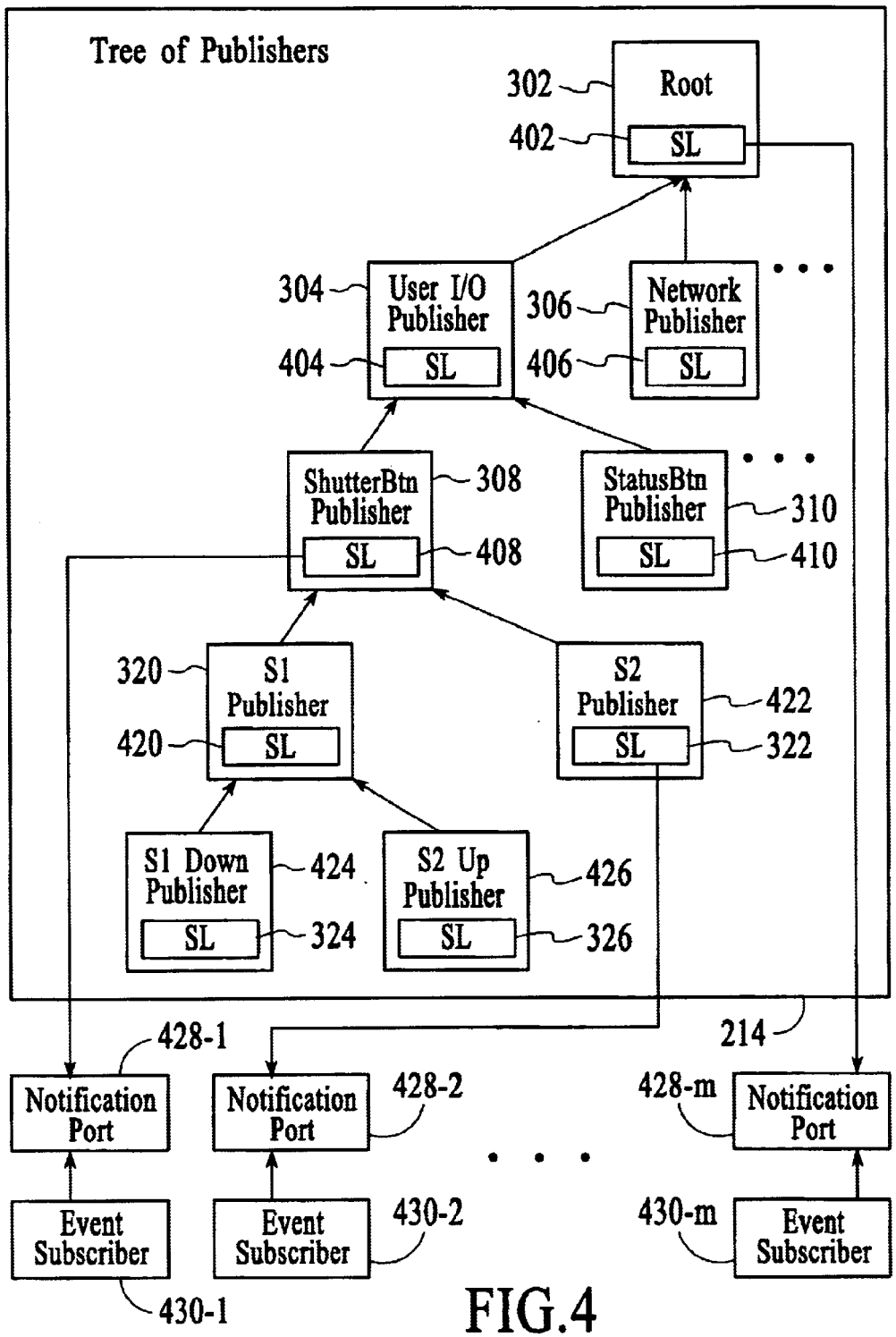
FIG. 4 illustrates a preferred embodiment of a scheme for managing subscriptions utilizing the publisher tree in accordance with the present invention.

FIG. 4 illustrates a preferred embodiment of a scheme for managing subscriptions utilizing the publisher tree 214 in accordance with the present invention. The scheme includes a plurality of notification publishers 302–326, configured in a tree 214. For purposes of illustrating the scheme, the publisher tree 214 illustrated in FIG. 3 is used. Each notification publisher 302–326 includes a subscriber list, 402–426 respectively. The scheme also includes a plurality of notification ports, 428-1 through 428-m. Each notification port is created by an event subscriber, 430-1 through 430-m, interested in receiving notifications of particular sets of events. The function of a notification port, 428-1 through 428-m, is to receive notification messages from event sources and delivering the messages to the event subscriber which created it. Any delivery method may be used. Two examples of delivery methods include a callback port and a message queue. Callback ports and message queues are well known in the art and will not be described in detail here.

To subscribe to a set of events, an event subscriber places the identity of its notification port in a subscriber list which manages notifications for that set of events. Each notification publisher also contains a reference to its parent notification publisher. For example, to subscribe to S2 position events, the event subscriber 430-2 places the identity of its notification port 428-2 on the subscriber list 422 of the S2 Publisher 322.

Figure 5:
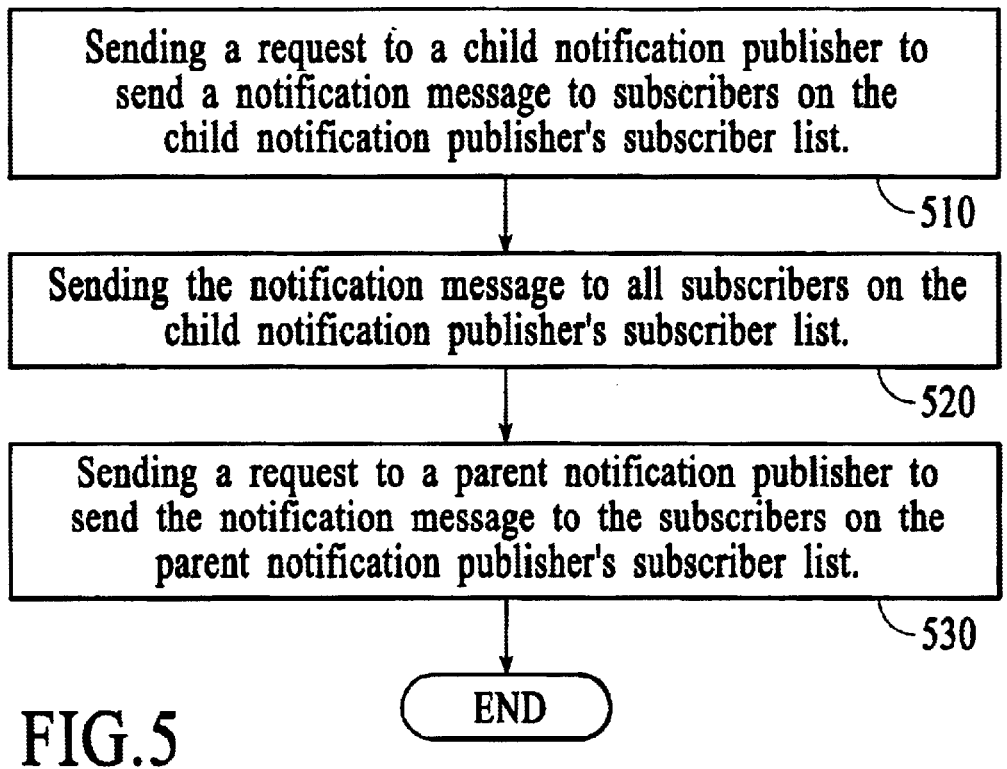
FIG. 5 is a flow chart illustrating a preferred embodiment of a method for managing subscriptions using a publisher tree in accordance with the present invention.

FIG. 5 is a flow chart illustrating a preferred embodiment of a method for managing subscriptions using a publisher tree in accordance with the present invention. First, an event source sends a request to a child notification publisher to send a notification message to the subscribers on its subscriber list, via step 510. Next, the child notification publisher sends the notification message to all subscribers on its subscriber list, via step 520. In the preferred embodiment, the subscriber list contains the identities of the notification ports interested in receiving messages from it. The notification port then delivers the message to its event subscribers. Also, the child notification publisher sends a request to its parent notification publisher to send the notification message to the subscribers on the parent notification publisher's subscriber list, via step 530. The steps 520 and 530 are then repeated by each notification publisher until the notification publisher at the root node of the tree has sent the message to the subscribers on its subscriber list.

For example, referring to FIG. 4, when an S2 position event occurs, the event source sends a request to the S2 Publisher 322 to send a notification message to the subscribers on its subscriber list 422, via step 510. The S2 Publisher 322 then sends the notification message to notification port 428-2 and any other port on its subscriber list 422, via step 520. The notification port 428-2 delivers the notification message to its event subscriber 430-2. The S2 Publisher 322 then sends a request to its parent notification publisher, Shutter Button Publisher 308, to send the notification message to the subscribers on its subscriber list 408, via step 530. The Shutter Button Publisher 308 sends the notification message to notification port 428-1 since port 428-1 is on its subscriber list 408, via step 520. The notification port 428-1 delivers the notification message to its event subscriber 430-1. The Shutter Button Publisher 308 then sends a request to its parent notification publisher, User I/O Publisher 304, to send the notification message to the subscribers on its subscriber list 404, via step 530. The User I/O Publisher 304 then sends the notification message to all subscribers on its subscriber list 404, via step 520. The User I/O Publisher 304 sends a request to its parent notification publisher, the publisher at the root node 302, to send the notification message to the subscribers on its subscriber list 402, via step 530. The root node publisher 302 then sends the notification message to all subscriber on its subscriber list, via step 520, including notification port 428-m. Notification port 428-m delivers the message to its event subscriber 430-m. Since the root node publisher 302 has no parent, the notification process is complete.

In this manner, event subscribers can request subscriptions at various granular levels, i.e., subscribe to notification publishers at a lower level in the tree 214. At the same time, event subscribers can subscribe to receive whole categories of messages from event sources by subscribing to a notification publisher at a higher level in the tree 214. Because notification messages sent by the notification publishers at the lowest level of the tree 214 are also sent by the parents of these publishers, event subscribers are not required to subscribe to each notification publisher at the lower levels in order to receive these whole categories of messages. For example, an event subscriber need only subscribe to the Shutter Button Publisher 308 to be notified of all shutter button related events without needing to subscribe to both the S1 Publisher 320 and the S2 Publisher 322 or to their child notification publishers.

This scheme does not require the event sources to know anything about the event subscribers or what messages they are interested in receiving. The event sources only need to create the notification message and pass it to a lower level notification publisher. Further, the notification message need not supply any code to manage subscriptions or to route the notifications. These are handled by the notification publishers.

Figure 6:
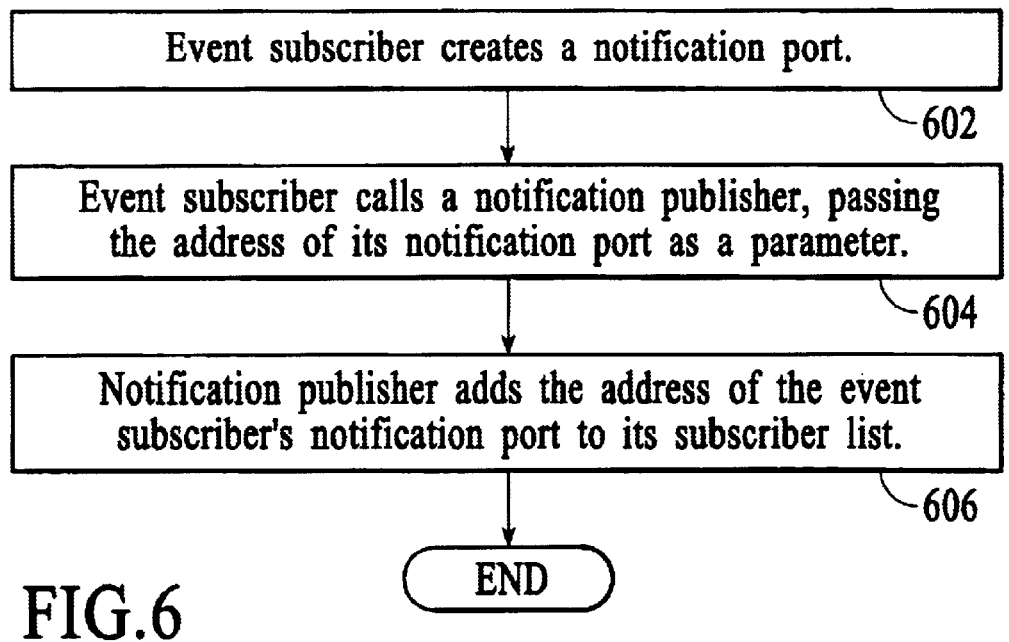
FIG. 6 is a flowchart illustrating how an event subscriber registers with a notification publisher to receive notification messages in accordance with the present invention.

FIGS. 6 and 7 are flowcharts illustrating in more detail the preferred embodiment of the method for managing subscriptions using a publisher tree 214 in accordance with the present invention. FIG. 6 is a flowchart illustrating how an event subscriber registers with a notification publisher to receive notification messages in accordance with the present invention. First, the event subscriber creates a notification port, via step 602. The type of port it creates depends on its preferred method of message delivery. Next, the event subscriber calls a notification publisher, passing the address of its notification port as a parameter, via step 604. Then, the notification publisher adds the address of the event subscriber's notification port to its subscriber list, via step 606.

FIG. 7 is a flowchart illustrating in more detail the sending of notification messages using a publisher tree in accordance with the preferred embodiment of the present invention. In the preferred embodiment, the notification process is implemented using an object oriented programming language. First, an event occurs at an event source, via step 702. The event source calls a create method to create the notification message, via step 704. A "method" in an object oriented programming language is equivalent to a function. Thus a call to the create method via step 704 is equivalent to calling a function which creates the notification message. Next, the event source calls the send method of a child notification publisher corresponding to the event, passing the notification message as a parameter, via step 706. The send method causes the child notification publisher to retrieve the address of each notification port on its subscriber list and to call a post method, passing the address of each notification port and the notification message as parameters, via step 708. The post method causes the notification port to deliver the notification message to its event subscriber. If the child notification publisher has a parent, as determined by step 710, then the child notification publisher calls the parent notification publisher's send method, passing the notification message as a parameter, via step 712. The parent notification publisher is now considered the "child" notification publisher, via step 714. Steps 708 through 714 are then repeated until the current child notification publisher is determined to not have a parent, via step 710, i.e., the current child notification publisher is at the root node.

For example, referring to FIG. 4, assume that an S1 down event occurs, via step 702. An event source then calls a create method to create a notification message containing information concerning the event, via step 704. The event source calls the send method of the child notification publisher corresponding to this event, the S1Down Publisher 324, passing the notification message as a parameter, via step 706. The S1Down Publisher 324 then retrieves the address of each notification port on its subscriber list 424 and calls the post method, passing the address of each notification port and the notification message as parameters, via step 708. The post method causes each notification port to deliver the notification message to its corresponding event subscriber. Since the S1Down Publisher 324 references a parent, S1 Publisher 320, via step 710, it also calls the send method of S1 Publisher 320, passing the notification message as a parameter, via step 712. The S1 Publisher 320 now becomes the "child" notification publisher, via step 714.

The S1 Publisher 320 retrieves the address of each notification port on its subscriber list 420 and calls the post method, passing the address of each notification port and the notification message as parameters, via step 708. Since the S1 Publisher 320 references a parent, Shutter Button Publisher 308, via step 710, it calls the send method of the Shutter Button Publisher 308, passing the notification message as a parameter, via step 712. The Shutter Button Publisher 308 now becomes the "child" notification publisher, via step 714.

The Shutter Button Publisher 308 retrieves the address of each notification port on its subscriber list 408 and calls the post method, passing the address of each notification port and the notification message as parameters, via step 708. Since the Shutter Button Publisher 308 references a parent, User I/O Publisher 304, via step 710, it calls the send method of the User I/O Publisher 304, passing the notification message as a parameter, via step 712. The User I/O Publisher 304 now becomes the "child" notification publisher, via step 714.

The User I/O Publisher 304 retrieves the address of each notification port on its subscriber list 408 and calls the post method, passing the address of each notification port and the notification message as parameters, via step 708. Since the User I/O Publisher 304 references a parent, the root node notification publisher 302, via step 710, it calls the send method of the root node notification publisher 302, passing the notification message as a parameter, via step 712. The root node notification publisher 302 now becomes the "child" notification publisher, via step 714.

The root node notification publisher 302 retrieves the address of each notification port on its subscriber list 402 and calls the post method, passing the address of each notification port and the notification message as parameters, via step 708. Since the root node notification publisher 302 is the root node, it does not reference a parent, as determined via step 710. The notification process for this event is thus complete.

Although the preferred embodiment of the present invention has been described in the context of event notification, one of ordinary skill in the art will understand that the publisher tree structure may be used with other subscription-based systems without departing from the spirit and scope of the present invention.

An improved method and system for managing subscriptions in a software system has been disclosed. The method and system in accordance with the present invention utilizes a publisher tree for managing subscriptions. This tree allows event subscribers to request subscriptions at a granular level without requiring the event subscribers who do not need a granular subscription to have multiple subscriptions to receive whole categories of messages from event sources. Further, this tree does not require the event sources to know anything about the event subscribers or what messages they are interested in receiving. Event sources only need to know the most granular level of subscriptions that the system supports, i.e., the leaf nodes of the tree. The structure of the publisher tree may thus be altered without the need to rewrite the programs at the event sources and subscribers. If the leaf nodes change, then the event sources will require minimal modifications, and the event subscribers will require updating. These changes may be implemented at run-time. The present invention also requires less event processing time and memory than conventional methods.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing notification subscriptions, comprising the steps of:

(a) sending a request to a child notification publisher to send a notification message to at least one subscriber on the child notification publisher's subscriber list, wherein the child notification publisher is one of a plurality of notification publishers organized in a tree structure, wherein each of the plurality of notification publishers manages notifications of a particular set of events for an event source, wherein each child notification publisher manages notifications of a subset of the events managed by its parent notification publisher;

(b) sending the notification message to the at least one subscriber on the child notification publisher's subscriber list; and (c) sending a request to said parent notification publisher by the child notification publisher to send the notification message to at least one subscriber on the parent notification publisher's subscriber list.

2. The method of claim 1, wherein the sending step (a) comprises:

(a1) creating the notification message; and (a2) calling a send method of the child notification publisher, wherein the notification message is passed as a parameter.

3. The method of claim 1, wherein the sending step (b) comprises:

(b1) retrieving an address of each notification port on the child notification publisher's subscriber list; and (b2) calling a post method, wherein the notification message and the address of each notification port on the child notification publisher's subscriber list are passed as parameters.

4. The method of claim 1, wherein the sending step (c) comprises:

(c1) determining if the child notification publisher has a reference to the parent notification publisher;

(c2) calling a send method of the parent notification publisher if the child notification publisher has a reference to the parent notification publisher, wherein the notification message is passed as a parameter.

5. The method of claim 1, further comprising:

(d) considering the parent notification publisher as the child notification publisher; and (e) returning to step (b).

6. The method of claim 1, wherein the child notification publisher's subscriber list comprises a plurality of addresses of notification ports registered to receive notification messages from the child notification publisher.

7. The method of claim 6, wherein registering the notification ports comprises the steps of:

(1) creating a notification port by an event subscriber;

(2) calling the child notification publisher by the event subscriber, wherein the address of the notification port is passed as a parameter; and (3) adding the address of the notification port to the child notification publisher's subscriber list.

8. A method for managing notification subscriptions, comprising the steps of:

(a) sending a request to a child notification publisher to send a notification message to at least one subscriber on the child notification publisher's subscriber list, wherein the child notification publisher is one of a plurality of notification publishers organized in a tree structure, wherein each of the plurality of notification publishers manages notifications of a particular set of events for an event source, wherein each child notification publisher manages notifications of a subset of events managed by its parent notification publisher;

(b) retrieving an address of each notification port on the child notification publisher's subscriber list;

(c) calling a post method, wherein the notification message and the address of each notification port on the child notification publisher's subscriber list are passed as parameters;

(d) determining if the child notification publisher has a reference to a parent notification publisher; and (e) calling a send method of the parent notification publisher to send the notification message to at least one subscriber on the parent notification publisher's subscriber list if the child notification publisher has a reference to the parent notification publisher, wherein the notification message is passed as a parameter.

9. The method of claim 8, wherein the sending step (a) comprises:

(a1) creating the notification message; and (a2) calling a send method of the child notification publisher, wherein the notification message is passed as a parameter.

10. The method of claim 8, further comprising:

(f) considering the parent notification publisher as the child notification publisher; and (g) returning to step (b).

11. The method of claim 8, wherein a registering of each notification port on the child notification publisher's subscriber list comprises the steps of:

(1) creating the notification port by an event subscriber;

(2) calling the child notification publisher by the event subscriber, wherein the address of the notification port is passed as a parameter; and (3) adding the address of the notification port to the child notification publisher's subscriber list.

12. A method for managing notification subscriptions, comprising the steps of:

(a) creating a notification message;

(b) calling a send method of a child notification publisher, wherein the notification message is passed as a parameter, wherein the child notification publisher is one of a plurality of notification publishers organized in a tree structure, wherein each of the plurality of notification publishers manages notifications of a particular set of events for an event source, wherein each child notification publisher manages notification of a subset of events managed by its parent notification publisher;

(c) retrieving an address of each notification port on the child notification publisher's subscriber list;

(d) calling a post method, wherein the notification message and the address of each notification port on the child notification publisher's subscriber list are passed as parameters;

(e) determining if the child notification publisher has a reference to a parent notification publisher;

(f) calling a send method of the parent notification publisher to send the notification message to at least one subscriber on the parent notification publisher's subscriber list if the child notification publisher has a reference to the parent notification publisher, wherein the notification message is passed as a parameter;

(g) considering the parent notification publisher as the child notification publisher; and (h) returning to step (c).

13. A system for managing subscriptions, comprising:

a plurality of event subscribers;

a plurality of notification ports for delivery of notification messages to a corresponding event subscriber;

at least one event source; and a plurality of notification publishers organized in a tree structure, wherein each of the plurality of notification publishers manages notifications of a particular set of events from the at least one event source, wherein each child notification publisher manages notifications for a subset of events managed by its parent notification publisher, each notification publisher comprising:

a subscriber list for its set of events, comprising addresses of notification ports; and a reference to a parent notification publisher, wherein each notification publisher sends a notification message concerning its set of events on the at least one event source to each notification port on the subscriber list;

wherein each notification publisher sends a request to the parent notification publisher to send the notification message to each notification port on the parent notification publisher's subscriber list.

14. A system for managing subscriptions, comprising:

means for sending a request to a child notification publisher to send a notification message to at least subscriber on the child notification publisher's subscriber list, wherein the child notification publisher is one of a plurality of notification publishers organized in a tree structure, wherein each of the plurality of notification publishers manages notifications of a particular set of events for an event source, wherein each child notification publisher manages notifications of a subset of events managed by its parent notification publisher;

means for sending the notification message to the subscribers on the child notification publisher's subscriber list; and means for ending a request to said parent notification publisher by the child notification publisher to send the notification message to the at least one subscriber on the parent notification publisher's subscriber list.

15. A computer readable medium with program instructions for managing subscriptions, including the instructions for:

(a) sending a request to a child notification publisher to send a notification message to at least one subscriber on the child notification publisher's subscriber list, wherein the child notification publisher is one of a plurality of notification publishers organized in a tree structure, wherein each of the plurality of notification publishers manages notifications of a particular set of events for an event source, wherein each child notification publisher manages notifications for a subset of events managed by its parent notification publisher;

(b) sending the notification message to the subscribers on the child notification publisher's subscriber list; and (c) sending a request to said parent notification publisher by the child notification publisher to send the notification message to the at least one subscriber on the parent notification publisher's subscriber list.

16. A digital imaging device, comprising:

an imaging device;

at least one hardware element pertaining to a user interface; and a computer coupled to the imaging device and the at least one hardware, comprising:

a central processing unit; and a memory coupled to the central processing unit, the memory containing program instructions for providing a plurality of notification publishers organized in a tree structure, wherein each of the plurality of notification publishers manages notifications of a particular set of events from the at least one event source, wherein each child notification publisher manages notifications of a subset of events managed by its parent notification publisher, each notification publisher comprising:

a subscriber list for its set of events, comprising addresses of notification ports, and a reference to a parent notification publisher, wherein each notification publisher sends a notification message concerning its set of events on at least one event source to each notification port on the subscriber list, wherein each notification publisher sends a request to the parent notification publisher to send the notification message to each notification port on the parent notification publisher's subscriber list.

* * * * *